(12) United States Patent
Voirin et al.

(10) Patent No.: US 8,022,873 B2
(45) Date of Patent: Sep. 20, 2011

(54) METHODS AND SYSTEM FOR DETERMINING ANGLES OF SIGHT BETWEEN TWO DEVICES

(75) Inventors: Thomas Voirin, Leiden (NL); Erwan Kervendal, Toulouse (FR); Xavier Sembély, Toulouse (FR)

(73) Assignee: Astrium SAS, Paris (FR)

( * ) Notice: Subject to any disclaimer, the term of this patent is extended or adjusted under 35 U.S.C. 154(b) by 202 days.

(21) Appl. No.: 12/362,648

(22) Filed: Jan. 30, 2009

(65) Prior Publication Data

US 2009/0195457 A1 Aug. 6, 2009

(30) Foreign Application Priority Data

Jan. 30, 2008 (FR) ...................................... 08 50556

(51) Int. Cl.
*G01S 5/04* (2006.01)
(52) U.S. Cl. ........................ 342/442; 342/445
(58) Field of Classification Search .................. 342/385, 342/442, 445, 357.25, 357.3
See application file for complete search history.

(56) References Cited

U.S. PATENT DOCUMENTS 5,652,590 A 7/1997 Deaton

FOREIGN PATENT DOCUMENTS

| WO | 03/076962 A | 9/2003 |
|----|-------------|--------|
| WO | 2007/013069 A | 2/2007 |

*Primary Examiner* — Dao Phan
(74) *Attorney, Agent, or Firm* — Perman & Green, LLP

(57) ABSTRACT

A method of determining angles of sight between a receiver device having at least two reception antennas and at least one transmitter device having at least one transmission antenna for the transmission of radioelectric signals including at least two wavelengths. The determining method is based on angular phase measurements of the radioelectric signals, which are measured modulo $2\pi$ and are therefore ambiguous since they are known to within an integer number of times $2\pi$. The ambiguity in the phase measurements is resolved in the case of an application of the determining method to a receiver device dimensioned by applying a method of design of a system for determining angles of sight. A receiver device implements the determining method, and a system for determining angles of sight includes the receiver device and at least one transmitter device.

29 Claims, 2 Drawing Sheets

METHODS AND SYSTEM FOR DETERMINING ANGLES OF SIGHT BETWEEN TWO DEVICES

CROSS-REFERENCE TO RELATED APPLICATIONS

This application claims priority to and the benefit of French Application No. 08 50556 filed on 30 Jan. 2008, the disclosures of which are incorporated by reference in its entirety.

The aspects of the disclosed embodiments relate to the determination of angles of sight between two devices. More particularly, the disclosed embodiments relate to the determination of angles of sight based on angular phase measurements of radioelectric signals transmitted by a first device and received by a second device.

BACKGROUND

The line of sight of a first device termed the transmitter in a frame tied to a second device termed the receiver is by definition the direction in said frame of the receiver device of a vector connecting the center of said frame of the receiver device to the center of a frame tied to the transmitter device.

The knowledge of the line of sight between a first vehicle carrying the transmitter device and a second vehicle carrying the receiver device is used in numerous applications, in particular in aerospace systems.

For example, the knowledge of the line of sight between two vehicles, associated with knowledge of a distance between said two vehicles, makes it possible to determine the relative position of the first vehicle with respect to the second vehicle. The knowledge of the relative position is particularly useful in the case of space vehicles performing an autonomous rendezvous mission in orbit (the vehicles approaching one another up to contact), or a formation flying mission (the vehicles having to stabilize themselves precisely in a fixed position with respect to one another). In these two examples, the distance between the two vehicles generally lies between a few meters and a few kilometers.

Another application of the knowledge of the line of sight is attitude determination, which can be obtained on the basis of the knowledge of the lines of sight between the receiver device whose attitude one wishes to determine, and at least two transmitter devices whose relative positions are known (such as GPS satellites) and such that the corresponding lines of sight are substantially different.

In practice, in these applications, the uncertainty in the line of sight between the transmitter and receiver devices must be as small as possible, preferably between a few tenths of degrees and a few degrees. Moreover, the determination of the line of sight must be carried out in the simplest possible manner without introducing overly significant design constraints on the transmitter and receiver devices.

Known methods for determining line of sight are based on angular phase measurements of radioelectric signals transmitted by a transmission antenna of the transmitter device and received by a base of reception antennas of the receiver device, that is to say a pair of reception antennas $R_1$ and $R_2$, separated by a distance $L^{12}$ which generally lies between a few tens of centimeters and a few meters. The radioelectric signals comprise at least one periodic component of fixed and known wavelength $\lambda_1$.

The known methods based on angular phase measurements use a measurement $\Delta\tilde{\varphi}_1^{12}$ of a difference of the angular phases of the radioelectric signals received on the two reception antennas, said angular phases being measured modulo $2\pi$. A measurement $\Delta\tilde{\phi}_1^{12}$ of linear phase difference, dimensionally equivalent to a distance, is obtained on the basis of the measurement $\Delta\tilde{\varphi}_1^{12}$ of angular phase difference by calculating:

$$\Delta\tilde{\phi}_1^{12} = \frac{\Delta\tilde{\varphi}_1^{12}\lambda_1}{2\pi}.$$

In the case where the distance between the transmitter and receiver devices is large compared with the distance $L^{12}$, typically by a factor of 10 or more, the linear phase difference depends essentially on a difference in path length $d^{12}$ of the radioelectric signals received on the two reception antennas $R_1$ and $R_2$. The knowledge of said difference in path length makes it possible to determine an angle of sight which is the angle between the straight line joining the radioelectric centers of the two reception antennas and the straight line joining the radioelectric center of one of the two reception antennas to the radioelectric center of the transmission antenna.

The use of at least three nonaligned reception antennas makes it possible to determine at least two angles of sight which completely define the line of sight.

An essential difficulty with these methods is to do with the fact that the angular phases are measured modulo $2\pi$, that is to say they are known only to within an integer number of times $2\pi$, the integer number being a priori unknown. To determine the difference in path length $d^{12}$, the ambiguity in the measurement $\Delta\tilde{\phi}_1^{12}$ of linear phase difference must be resolved by determining the corresponding integer.

To resolve the ambiguity in the measurement $\Delta\tilde{\phi}_1^{12}$ of linear phase difference, it is known from a method, termed "null space" in the literature, to carry out a systematic exploration of all the combinations of integers and to determine the most likely combination. This method exhibits the drawback of being complex and of requiring high calculation power.

It is also known from a method, termed "motion based", to impress a known rotation motion on the vehicle carrying the receiver device, and to use this motion to resolve the ambiguity. In this case, the implementation of the method imposes significant constraints on the operations of the system, and introduces a lag in performing the rotation motion during which the line of sight may change.

A method, termed "pseudo-distance" or "pseudo-range", determines the difference in path length directly on the basis of measurements of the propagation times between the transmission antenna of the transmitter device and the reception antennas of the receiver device.

By directly determining the difference in path length without using the measurement $\Delta\tilde{\phi}_1^{12}$ of linear phase difference, there is no ambiguity to be resolved. However, the estimate of the difference in path length thus obtained is very noisy since in practice it is difficult to obtain propagation time measurements with good accuracy, in particular in the presence of multipaths between the transmitter device and the receiver device.

SUMMARY

The aspects of the disclosed embodiments propose a method for determining line of sight whose accuracy corresponds to the current requirements. The calculations to be performed are fairly few and analytical, and the ambiguity is resolved in the case where the reception antennas and wavelengths of the radioelectric signals transmitted by the transmitter device satisfy certain conditions, which are guaranteed by the implementation of a design method.

According to one aspect of the disclosed embodiments, a method for determining at least one angle of sight between a receiver device comprising at least two reception antennas and at least one transmitter device comprising at least one antenna for transmitting radioelectric signals on at least two different wavelengths $\lambda_1$ and $\lambda_2$ adapted to be received by the at least two reception antennas of said receiver device, in which at least one difference in path length of the radioelectric signals between two reception antennas of a base of antennas is estimated so as to determine the at least one angle of sight, comprises a step of determining for each wavelength $\lambda_p$ considered, p=1 and 2, a measurement $\Delta\tilde{\psi}_p^{12}$ of phase difference $\Delta\tilde{\psi}_p^{12}=C_p\Delta\phi_p^{12}$ between the two reception antennas, where $C_p$ denotes an a priori known nonzero real number and $\Delta\phi_p^{12}$ denotes a linear phase difference, dimensionally equivalent to a distance.

The method according to one embodiment comprises:

determination of a virtual phase difference $\Delta\tilde{\psi}_{WL}^{12}$ between the two reception antennas by linear combination of the measurements $\Delta\tilde{\psi}_p^{12}$ of phase differences determined for each wavelength $\lambda_p$, expressed in the form:

$$\Delta\tilde{\psi}_{WL}^{12} = D\left(\frac{P}{C_1\lambda_1}\Delta\tilde{\psi}_1^{12} - \frac{Q}{C_2\lambda_2}\Delta\tilde{\psi}_2^{12}\right).$$

where D denotes an a priori known nonzero real number, P and Q are nonzero integers such that $P\lambda_2 \neq Q\lambda_1$, determination of an integer value $\Delta\hat{N}_{WL}^{12}$ of an ambiguity of the virtual phase difference $\Delta\tilde{\psi}_{WL}^{12}$, equal to:

$$\Delta\hat{N}_{WL}^{12} = R\left(-\Delta\tilde{\psi}_{WL}^{12}/D\right),$$

where R(x) denotes the integer closest to x, determination of a first estimation $d_{WL}^{12}$ of the at least one difference in path length of the radioelectric signals between the two reception antennas, equal to:

$$\hat{d}_{WL}^{12} = \frac{\lambda_{WL}^{12}}{D}\left(\Delta\tilde{\psi}_{WL}^{12} + D\Delta\tilde{N}_{WL}^{12}\right),$$

where $\lambda_{WL}^{12}$ is a virtual wavelength equal to $\lambda_1\lambda_2/(P\lambda_2 - Q\lambda_1)$.

To improve the accuracy of the estimation of the at least one difference in path length, the method also comprises the following steps:

determination of at least one integer value $\Delta\hat{N}_p^{12}$ of an ambiguity of the measurement $\Delta\tilde{\psi}_p^{12}$ of phase difference of a wavelength $\lambda_p$, p=1 and/or 2, as being equal to:

$$\Delta\hat{N}_p^{12} = R\left(\frac{-\Delta\tilde{\psi}_p^{12} + C_p\hat{d}_{WL}^{12}}{\lambda_p C_p}\right),$$

determination of at least one second estimation $d_p^{12}$, p=1 and/or 2, of the at least one difference in path length of the radioelectric signals between the two reception antennas, as being equal to:

$$\hat{d}_p^{12} = \frac{\left(\Delta\tilde{\psi}_p^{12} + \lambda_p C_p \Delta\hat{N}_p^{12}\right)}{C_p}.$$

Advantageously, an estimation of the at least one difference in path length is calculated by least squares on the basis of at least two estimations of said at least one difference in path length from among the estimations $d_{WL}^{12}$, $d_1^{12}$ and $d_2^{12}$ and of an estimation of a level of errors present in said estimations.

If a single estimation $d_p^{12}$ must be calculated, a level of errors present in the measurement $\Delta\tilde{\psi}_p^{12}$ of phase difference is estimated for each wavelength $\lambda_p$, p=1 and 2, and a single estimation $d_p^{12}$ of the at least one difference in path length is calculated on the basis of the measurement $\Delta\tilde{\psi}_p^{12}$, p=1 or 2, of phase difference for which the estimated level of errors is smallest.

In order to reduce the level of measurement noise, successive estimated values of the at least one difference in path length, obtained on the basis of a succession of measurements of phase difference, are filtered.

To initially reduce measurement errors, an estimation $\Delta\hat{\beta}_p^{12}$ of a differential measurement bias $\Delta\beta_p^{12}$ in the measurement $\Delta\tilde{\psi}_p^{12}$ of phase difference, equal to $C_p\Delta b_p^{12}$ where $\Delta b_p^{12}$ denotes a linear phase differential measurement bias, is previously established by theory or simulation or experimentation for at least one wavelength $\lambda_p$, p=1 and/or 2, and the steps of said method are applied by replacing at least one measurement $\Delta\tilde{\psi}_p^{12}$ of phase difference by a measurement of phase difference after correction $\Delta\tilde{\psi}_p^{12} - \Delta\hat{\beta}_p^{12}$, p=1 and/or 2.

To improve the performance of the method, an estimation $\Delta\hat{\beta}_p^{12}$ of a differential measurement bias $\Delta\beta_p^{12}=C_p\Delta b_p^{12}$ in the measurement $\Delta\tilde{\psi}_p^{12}$ of phase difference is determined for at least one wavelength $\lambda_p$, p=1 and/or 2, at least on the basis of angular-phase responses of the two reception antennas previously determined by theory or simulation or experimentation, and of at least one value of an angle of sight determined on the basis of an estimation of the at least one difference in path length obtained by the method, and the steps of said method are applied by replacing at least one measurement $\Delta\tilde{\psi}_p^{12}$ of phase difference by a measurement of phase difference after correction $\Delta\tilde{\psi}_p^{12} - \Delta\hat{\beta}_p^{12}$, p=1 and/or 2.

In this case and to reduce measurement errors in an iterative manner, the method is advantageously iterated at least twice, estimations $\Delta\hat{\beta}_p^{12}$, p=1 and/or 2, being calculated for each iteration of the method and the steps of said method being applied by replacing at least one measurement $\Delta\tilde{\psi}_p^{12}$ of phase difference by a measurement of phase difference after correction $\Delta\tilde{\psi}_p^{12} - \Delta\hat{\beta}_p^{12}$, p=1 and/or 2.

In the modes of implementation in which phase differences after correction are used, these are calculated either before determining the first estimation $d_{WL}^{12}$, preferably by considering two phase differences after correction $\Delta\tilde{\psi}_p^{12} - \Delta\hat{\beta}_p^{12}$, p=1 and 2, or after the calculation of the first estimation $d_{WL}^{12}$ so as to determine at least one second estimation $d_p^{12}$, p=1 and/or 2.

Preferably the nonzero integers P and Q are chosen so that the rational number P/Q is close to the ratio of the wavelengths $\lambda_1/\lambda_2$.

The aspects of the disclosed embodiments also relate to a method for determining the essential characteristics of a system for determining at least one angle of sight using the previous method. The method is characterized in that the essential characteristics are at least a value of a distance $L^{12}$ between the two reception antennas of the base of antennas considered to estimate the at least one difference in path length, values of the two wavelengths $\lambda_1, \lambda_2$, and values of the pair of nonzero integers P and Q, defining three groups of essential characteristics.

The method consists in determining a set of values for said essential characteristics which meets the following condition:

$$L^{12} < \frac{\lambda_1 \lambda_2}{2|P\lambda_2 - Q\lambda_1|}.$$

In order to take account of measurement errors in the radioelectric signals, estimations $\max|\Delta\hat{e}_p^{12}|$ of upper bounds of absolute values of differential errors of linear phase measurement between the two reception antennas of the base of antennas, dimensionally equivalent to distances, are determined for each wavelength $\lambda_p$, p=1 and 2, by theory or simulation or experimentation, a maximum upper bound $\max|\Delta\hat{e}^{12}|$ is defined equal to the largest of the estimations $\max|\Delta\hat{e}_p^{12}|$, and the method is such that the essential characteristics are determined so as to meet at least one of the following conditions:

$$L^{12} < \frac{\lambda_1 \lambda_2}{|P\lambda_2 - Q\lambda_1|}\left(\frac{1}{2} - \frac{|P|}{\lambda_1}\max|\Delta\hat{e}_1^{12}| - \frac{|Q|}{\lambda_2}\max|\Delta\hat{e}_2^{12}|\right).$$

$$L^{12} < \frac{\lambda_1 \lambda_2}{2|P\lambda_2 - Q\lambda_1|} - \frac{(|P|\lambda_2 + |Q|\lambda_1)}{|P\lambda_2 - Q\lambda_1|}\max|\Delta\hat{e}^{12}|.$$

Preferably, the essential characteristics are also chosen so that one at least of the following conditions is satisfied:

$$\max|\Delta\hat{e}_1^{12}| + \max|\Delta\hat{e}_2^{12}| < \frac{|P\lambda_2 - Q\lambda_1|}{2|P|},$$

$$\max|\Delta\hat{e}_1^{12}| + \max|\Delta\hat{e}_2^{12}| < \frac{|P\lambda_2 - Q\lambda_1|}{2|Q|},$$

$$\max|\Delta\hat{e}^{12}| < \frac{|P\lambda_2 - Q\lambda_1|}{4 \cdot \max(|P|, |Q|)}.$$

For example, the estimations $\max|\Delta\hat{e}_p^{12}|$ are determined on the basis of angular-phase responses of the two reception antennas of the base of antennas and/or on the basis of estimations of standard deviations of measurement noise.

In a mode of implementation of the method, the essential characteristics corresponding to two groups of essential characteristics are firstly determined, and then the essential characteristics corresponding to the last group are determined.

In another mode of implementation of the method, the essential characteristics corresponding to a group of essential characteristics are firstly determined, and then the essential characteristics corresponding to the last two groups are determined.

In these last two modes of implementation of the method, one of the two wavelengths may be previously constrained to be equal to a given value, such as for example a wavelength used by a satellite global navigation system.

The disclosed embodiments also relate to the receiver device which determines at least one angle of sight using the determining method of the disclosed embodiments.

The receiver device is such that at least one of the following conditions is satisfied for said base of antennas:

$$L^{12} < \frac{\lambda_1 \lambda_2}{2|P\lambda_2 - Q\lambda_1|},$$

$$L^{12} < \frac{\lambda_1 \lambda_2}{|P\lambda_2 - Q\lambda_1|}\left(\frac{1}{2} - \frac{|P|}{\lambda_1}\max|\Delta\hat{e}_1^{12}| - \frac{|Q|}{\lambda_2}\max|\Delta\hat{e}_2^{12}|\right),$$

$$L^{12} < \frac{\lambda_1 \lambda_2}{2|P\lambda_2 - Q\lambda_1|} - \frac{(|P|\lambda_2 + |Q|\lambda_1)}{|P\lambda_2 - Q\lambda_1|}\max|\Delta\hat{e}^{12}|.$$

Advantageously, the receiver device is also such that at least one of the following conditions is satisfied:

$$\max|\Delta\hat{e}_1^{12}| + \max|\Delta\hat{e}_2^{12}| < \frac{|P\lambda_2 - Q\lambda_1|}{2|P|},$$

$$\max|\Delta\hat{e}_1^{12}| + \max|\Delta\hat{e}_2^{12}| < \frac{|P\lambda_2 - Q\lambda_1|}{2|Q|},$$

$$\max|\Delta\hat{e}^{12}| < \frac{|P\lambda_2 - Q\lambda_1|}{4 \cdot \max(|P|, |Q|)}.$$

In the case of a receiver device comprising at least three reception antennas, the latter are preferably nonaligned, estimations of differences in path length are calculated for at least two antenna bases and the conditions previously described are satisfied for said at least two antenna bases.

In such a case, either an angle of sight is determined for each estimation of difference in path length, in a plane in space defined by the corresponding base of antennas and the transmitter device, and the at least two angles of sight are converted into an angle of azimuth and into an angle of elevation in a frame tied to the receiver device; or said angles of azimuth and of elevation are determined directly on the basis of the estimations of differences in path length.

Advantageously the reception antennas are designed to exhibit in a given direction substantially identical angular-phase responses so as to minimize phase differential measurement biases.

According to an aspect of the disclosed embodiments, a system for determining at least one angle of sight comprises a receiver device according to the aspects of the disclosed embodiments, and comprises at least one transmitter device comprising at least one antenna for transmitting radioelectric signals on at least the two wavelengths $\lambda_1, \lambda_2$.

Preferably, the radioelectric signals transmitted by the at least one transmitter device are compatible with radioelectric signals transmitted by a satellite global navigation system, and a transmitter device comprises a pseudolite.

To determine an orientation of the base of reception antennas of the receiver device in a reference frame, the determining system comprises at least two transmitter devices whose angles of sight with respect to the receiver device are substantially different, and determines said orientation by using on the one hand estimations of the angles of sight of the at least two transmitter devices and on the other hand relative positions of the receiver device with respect to the at least two transmitter devices known a priori in the reference frame.

In a preferred embodiment of the determining system, at least two transmitter devices are embedded in satellites of a satellite global navigation system and the receiver device is embedded in a vehicle comprising at least one receiver of the satellite global navigation system.

Advantageously, the relative positions of the receiver device with respect to the at least two transmitter devices are obtained from the at least one receiver of the satellite global navigation system.

To determine the attitude of the receiver device with respect to the reference frame, the receiver device comprises at least three nonaligned reception antennas.

BRIEF DESCRIPTION OF THE DRAWINGS

The following description of the aspects of the disclosed embodiments is given while referring to the figures which represent in a nonlimiting manner.

DETAILED DESCRIPTION

The aspects of the disclosed embodiments relate to a method of determination 6 for determining at least one angle of sight, a design method 7 for determining essential characteristics of a system 1 for determining angles of sight, a receiver device 3 for the implementation of said determining method, and also the corresponding system 1 for determining angles of sight.

Figure 1:
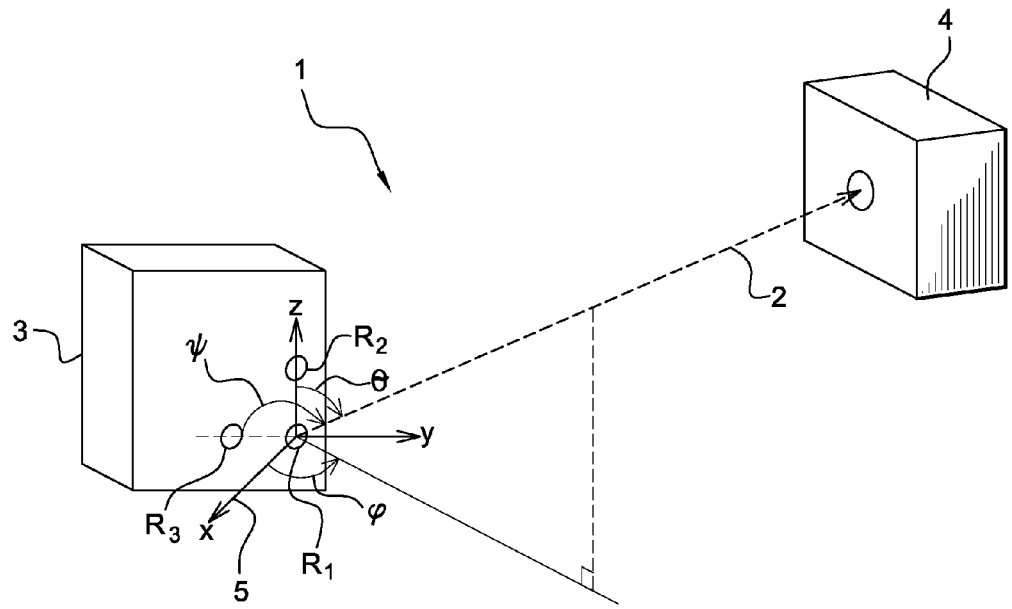
FIG. 1, a schematic representation in space of a system for determining angles of sight between two devices, illustrating the definitions used in the description, FIG. 2, a schematic representation illustrating the problem of determining an angle of sight in a plane, FIG. 3, the steps of the method for determining angles of sight according to aspects of the disclosed embodiments, FIG. 4, the steps of the design method for a system for determining angles of sight according to a mode of implementation.

The aspects of the disclosed embodiments apply to any system 1, represented in FIG. 1, for determining angles of sight based on angular phase measurements of radioelectric signals, transmitted by a transmitter device 4 and received by the receiver device 3 comprising at least two reception antennas.

The receiver 3 and transmitter 4 devices are embedded in vehicles, which in a nonlimiting manner are space and/or terrestrial vehicles, satellites or aircraft.

A line of sight 2 is determined essentially by two angles of sight, which define the direction in space of the transmitter device 4 with respect to a frame 5 of the receiver device 3. The two angles of sight are defined in two, preferably orthogonal, non-parallel planes. For example the line of sight is entirely determined by the angles of azimuth $\phi$ and of elevation $\theta$, which are angles of sight defined in the frame 5 tied to the receiver device.

Subsequently in the account, it is assumed that a difference between the lines of sight of two reception antennas of the receiver device 3 is negligible, that is to say the line of sight 2 is substantially the same for all the reception antennas of said receiver device. Such is the case for example if a tolerated angle error in the angles of sight defining the line of sight is large with respect to the difference of angles of said angles of sight, this being the case in particular if the dimensions of a base of antennas, that is to say of a pair of reception antennas, are small with respect to the distance between said devices.

Figure 3:
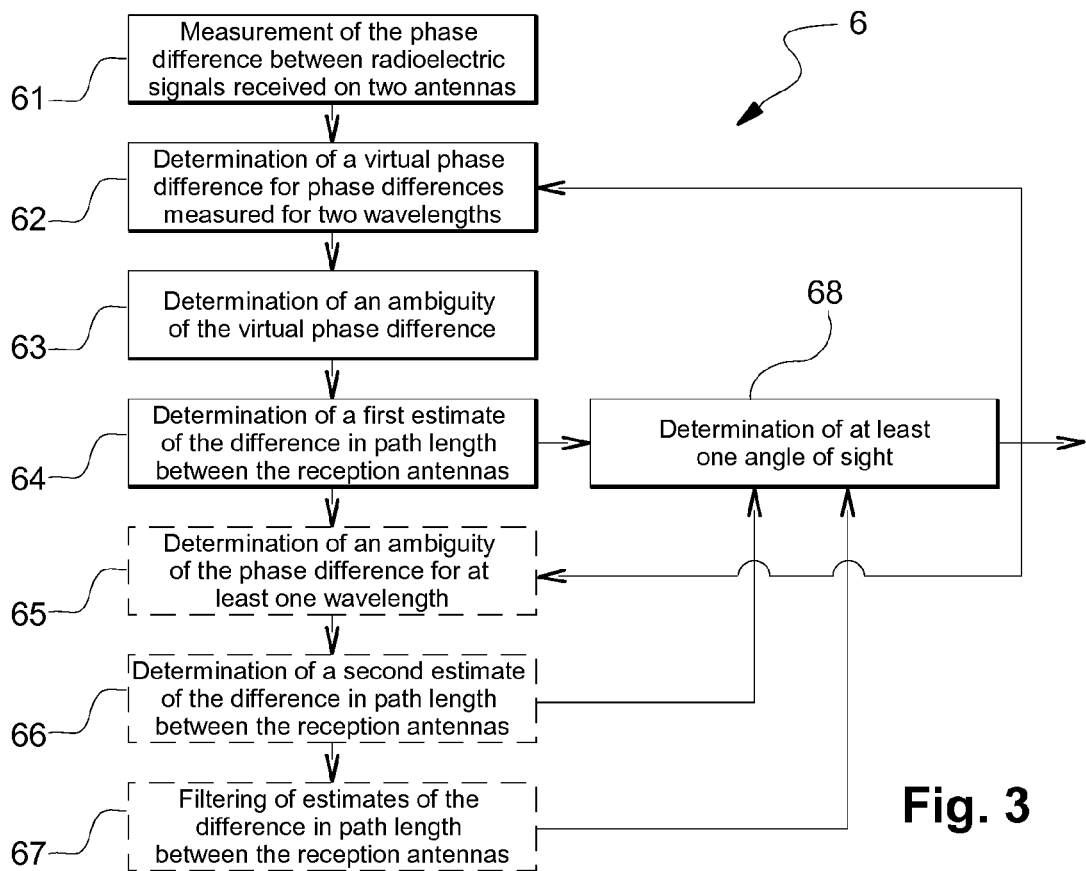

The method 6, represented in FIG. 3, for determining angles of sight in accordance with the aspects of the disclosed embodiments, comprises a plurality of steps preferably executed by the receiver device 3 for reasons of accuracy related to the speed of execution of the steps.

The determining method 6 is applied in a system 1 for determining angles of sight in which the transmitter device 4 comprises at least one transmission antenna, and the receiver device 3 comprises $N_R$ reception antennas $R_1$ to $R_{N_R}$, $N_R$ being greater than or equal to two.

The transmitter device 4 transmits radioelectric signals comprising $N_L$ distinct periodic components, $N_L$ being greater than or equal to two, which correspond to $N_L$ different wavelengths $\lambda_n$, $1 \leq n \leq N_L$. The radioelectric signals corresponding to different wavelengths are transmitted sequentially or simultaneously.

The determining method 6 permits the determination, apart from the sign, of one angle of sight per base of reception antennas, that is to say per pair of reception antennas. The angle of sight determined for the base of antennas considered is the angle between the straight line joining the radioelectric centers of the two reception antennas of the base of antennas and the straight line joining the radioelectric center of one of the two reception antennas to the radioelectric center of the transmission antenna.

The ambiguity in the sign of the angle of sight to be determined is resolved in practice because a base of antennas embedded in a vehicle ensures a field of vision of the order of $2\pi$ steradians only: the detection at the level of a base of antennas of a radioelectric signal power above a previously established threshold therefore makes it possible to assume that the transmitter device 4 is situated in the field of vision of the base of antennas considered, and to resolve said sign ambiguity. A field of vision of $4\pi$ steradians is obtained in practice by placing antenna bases on either side of said vehicle. Therefore, subsequently in the account it is assumed that the ambiguity in the sign of the angle of sight is resolved.

To determine two angles of sight which define the line of sight, the determining method 6 requires, for the receiver device 3, at least two non-parallel antenna bases, that is to say a number $N_R$ of reception antennas at least equal to three, the at least three reception antennas not being aligned, so as to define with the transmission antenna at least two non-parallel planes. The two determined angles of sight are for example for FIG. 1:

the angle of sight $\theta$ for the base of antennas $(R_1, R_2)$ and an angle of sight $\psi$ for the base of antennas $(R_1, R_3)$, on the basis of which the angles of elevation and of azimuth can be determined, the angles of elevation and of azimuth which are determined directly.

Figure 2:
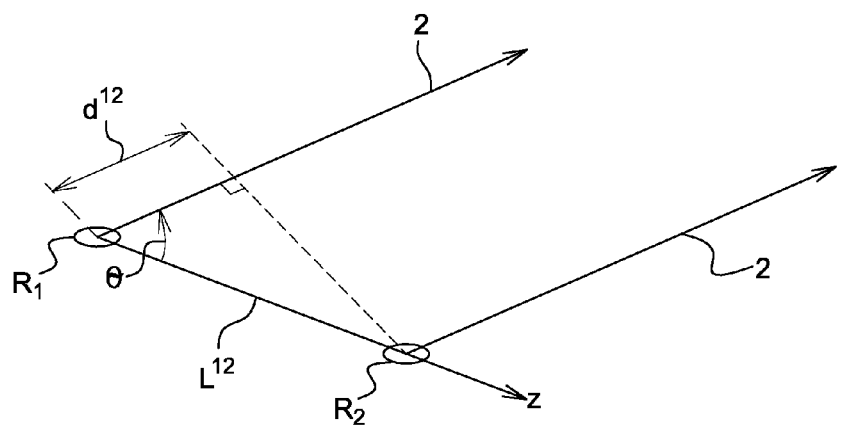

Initially, in order to present the principles of the disclosed embodiments, the determining method 6 is described in the case of determining an angle of sight for a base of antennas, that is to say in the case of a two-dimensional problem such as represented in FIG. 2. Furthermore the description is given for a determining system 1 comprising two wavelengths $\lambda_1$ and $\lambda_2$ and two reception antennas $R_1$ and $R_2$.

In a first step 61 of the determining method 6, measurements $\Delta\tilde{\phi}_n^{12}$ of differences of linear phase $\Delta\tilde{\phi}_n^{12}$, dimensionally equivalent to distances, between the two reception antennas $R_1$ and $R_2$, are determined for each wavelength $\lambda_n$ ($1 \leq n \leq 2$).

The measurements $\Delta\tilde{\phi}_n^{12}$ of differences of linear phase $\Delta\tilde{\phi}_n^{12}$, are for example obtained on the basis of measurements $\Delta\tilde{\varphi}_n^{12}$ of differences of angular phase $\Delta\varphi_n^{12}$, where $\Delta\varphi_n^{12} = \varphi_n^1 - \varphi_n^2$, $\varphi_n^1$ and $\varphi_n^2$ being the angular phases of the radioelectric signals received on the reception antennas $R_1$ and $R_2$, by applying the relation:

$$\Delta\tilde{\phi}_n^{12} = \frac{\Delta\tilde{\varphi}_n^{12} \lambda_n}{2\pi}.$$

In another mode of implementation, measurements $\tilde{\phi}_n^m$ of the linear phases $\tilde{\phi}_n^m$, such that $\Delta\tilde{\phi}_n^{12} = \tilde{\phi}_n^1 - \tilde{\phi}_n^2$, are obtained on the basis of measurements $\tilde{\phi}_n^m$ ($1 \leq m \leq 2$) of the angular phases, by applying the relation $\tilde{\phi}_n^m = \tilde{\phi}_n^m \lambda_n / 2\pi$.

The angular phase signals are defined to within $2\pi$, and are generally expressed by convention in the interval $]-\pi, \pi]$. However, the steps of the determining method 6 do not depend on the interval chosen to measure said angular phase signals.

The measurements $\tilde{\phi}_n^m$ of the linear phases $\phi_n^m$ are expressed in the form of a sum of terms that are dimensionally equivalent to distances:

$$\tilde{\phi}_n^m = \phi_n^m + e_n^m = d^m - \lambda_n N_n^m + \phi_n + e_n^m \quad (1)$$

In this expression:
- $d^m$ is a distance between the antenna of the transmitter device 4 and the reception antenna $R_m$ of the receiver device 3,
- $e_n^m$ is a linear phase measurement error which is generally decomposed into a linear phase measurement noise $\epsilon_n^m$ and a linear phase measurement bias $b_n^m$ which is introduced inter alia by the phase response of said reception antenna $R_m$ for the wavelength $\lambda_n$ and/or by multipaths between the transmitter device and the antenna $R_m$,
- $\phi_n$ corresponds to an initial linear phase at the level of the transmission antenna of the transmitter device 4,
- $N_n^m$ is an integer number representing the number of integer wavelengths traveled by the radioelectric signal of wavelength $\lambda_n$ between the transmitter device 4 and the reception antenna $R_m$ of the receiver device 3.

From (1) is deduced the expression for the two measurements $\Delta\tilde{\phi}_n^{12}$ of differences of linear phase:

$$\Delta\tilde{\phi}_n^{12} = d^{12} - \lambda_n \Delta N_n^{12} + \Delta e_n^{12} \quad (2)$$

where:
- $d^{12}$ is equal to $d^1 - d^2$ and corresponds to a difference in path length of the radioelectric signals, transmitted by the transmitter device 4, and received by the reception antennas $R_1$ and $R_2$ of the receiver device 3,
- $\Delta e_n^{12}$ is equal to $e_n^1 - e_n^2$ and corresponds to a linear phase measurement differential error for the wavelength $\lambda_n$ between said antennas $R_1$ and $R_2$, which is decomposed into a linear phase differential measurement bias $\Delta b_n^{12}$ equal to $b_n^1 - b_n^2$ and a linear phase differential measurement differential noise $\Delta\epsilon_n^{12}$ equal to $\epsilon_n^1 - \epsilon_n^2$,
- $\Delta N_n^{12}$ is an integer number equal to $N_n^1 - N_n^2$.

By considering (2) it is seen that the measurement $\Delta\tilde{\phi}_n^{12}$ of linear phase difference is equal, to within the differential measurement error $\Delta e_n^{12}$, to the difference between the difference in path length $d^{12}$ and the integer number $\Delta N_n^{12}$ multiplied by the wavelength $\lambda_n$. The integer number $\Delta N_n^{12}$ therefore corresponds to the remaining ambiguity in the measurement $\Delta\tilde{\phi}_n^{12}$ of linear phase difference, which must be resolved.

In a particular mode of implementation of the determining method 6, successive measurements of phase differences, linear or angular, are filtered to reduce the differential measurement noise. Advantageously, the successive measurements are obtained over a time window during which the variations in the angle of sight are negligible.

In another particular mode of implementation of the determining method 6, a correction of the linear phase differential measurement biases $\Delta b_n^{12}$ is carried out on the measurements $\Delta\tilde{\phi}_n^{12}$ of differences of linear phase.

The differential measurement biases $\Delta b_n^{12}$ are decomposed essentially into two parts:
- a part which does not depend on the sought-after angle of sight (bias introduced by the radioelectric stages of the reception antennas, differences of sampling frequency of the radioelectric signals, etc.),
- a part which depends on the sought-after angle of sight (angular-phase responses of the reception antennas $R_1$ and $R_2$, multipaths between the transmitter device 4 and said reception antennas, etc.).

In this mode, estimations $\Delta\hat{b}_n^{12}$ of the linear phase differential measurement biases $\Delta b_n^{12}$ are obtained beforehand for at least one of said two parts, by theory, simulation or experimentation. For example, estimations $\Delta\hat{b}_n^{12}$ are obtained for the part which depends on the sought-after angle of sight on the basis of the angular-phase responses of the reception antennas, which are known a priori by calibration, and of an approximate value of the sought-after angle of sight, obtained by other means.

In this mode of implementation, the subsequent steps of the method are applied by replacing the measurements $\Delta\tilde{\phi}_n^{12}$ of differences of linear phase by measurements of differences of linear phase after correction $\Delta\tilde{\phi}_n^{12} - \Delta\hat{b}_n^{12}$.

In a second step 62 of the determining method 6, the measurements $\Delta\tilde{\phi}_1^{12}$ and $\Delta\tilde{\phi}_2^{12}$ of differences of linear phase of the base of antennas for the two wavelengths $\lambda_1$ and $\lambda_2$ are combined linearly to obtain a virtual phase difference $\Delta\tilde{\phi}_{WL}^{12}$, also termed "Wide Lane" phase difference (hence the index notation WL).

The second step 62 consists in calculating the virtual phase difference $\Delta\tilde{\phi}_{WL}^{12}$:

$$\Delta\tilde{\phi}_{WL}^{12} = A\Delta\tilde{\phi}_1^{12} - B\Delta\tilde{\phi}_2^{12} \quad (3)$$

A and B are nonzero real numbers, which are equal respectively to $P\lambda_2/(P\lambda_2 - Q\lambda_1)$ and to $Q\lambda_1/(P\lambda_2 - Q\lambda_1)$, where P and Q are nonzero integers, which are parameters of the determining method 6, and which are such that $P\lambda_2 \neq Q\lambda_1$. For example, P and Q are equal to 1. Preferably, P and Q are chosen so that $P\lambda_2 - Q\lambda_1$ is small in absolute value so as to have real numbers A and B that are large in absolute value, that is to say so that the rational number P/Q is close to the ratio of the wavelengths $\lambda_1/\lambda_2$.

The real numbers A and B are preferably positive, but subsequently in the account the general case is described.

Considering (2) and (3), the expression for the virtual phase difference $\Delta\tilde{\phi}_{WL}^{12}$ is deduced:

$$\Delta\tilde{\phi}_{WL}^{12} = d^{12} - \lambda_{WL}^{12} \Delta N_{WL}^{12} + \Delta e_{WL}^{12} \quad (4)$$

In the above expression:
- $\lambda_{WL}^{12}$ is a virtual wavelength, which is equal to $\lambda_1 \lambda_2/(P\lambda_2 - Q\lambda_1)$,
- $\Delta e_{WL}^{12}$ is a linear phase measurement differential error equal to $A\Delta e_1^{12} - B\Delta e_2^{12}$,
- $\Delta N_{WL}^{12}$ is an integer number equal to $P\Delta N_1^{12} - Q\Delta N_2^{12}$ and corresponds to an ambiguity of the virtual phase difference $\Delta\tilde{\phi}_{WL}^{12}$.

In a third step 63 of the determining method 6, a value $\Delta\hat{N}_{WL}^{12}$ of the ambiguity of the virtual phase difference $\Delta\tilde{\phi}_{WL}^{12}$ is obtained by rounding $-\Delta\tilde{\phi}_{WL}^{12}/\lambda_{WL}^{12}$ to the closest integer, which is either higher or equal or lower.

The function for rounding to the closest integer value is denoted R(x) subsequently in the account.

According to expression (4), the value $\Delta\hat{N}_{WL}^{12}$ is therefore equal to:

$$\Delta\hat{N}_{WL}^{12} = R\left(-\frac{\Delta\tilde{\phi}_{WL}^{12}}{\lambda_{WL}^{12}}\right)$$

-continued $$= \Delta N_{WL}^{12} - R\left(\frac{1}{\lambda_{WL}^{12}}(d^{12} + \Delta e^{12 WL})\right).$$

The rounding function is such that $R(x)=0$ if $|x|<\frac{1}{2}$. Therefore, the value $\Delta \hat{N}_{WL}^{12}$ is strictly equal to the ambiguity $\Delta N_{WL}^{12}$ of the virtual phase difference $\Delta \tilde{\phi}_{WL}^{12}$ if the following condition is satisfied:

$$|d^{12}+A\Delta e_1^{12}-B\Delta e_2^{12}|<|\lambda_{WL}^{12}|/2 \qquad (5)$$

Upper bounds $\max|\Delta e_1^{12}|$ and $\max|\Delta e_2^{12}|$ of the absolute values of the differential errors of linear phase measurement respectively $\Delta e_1^{12}$ and $\Delta e_2^{12}$ are considered. If said absolute values of the differential measurement errors are not bounded, $\max|\Delta e_1^{12}|$ and $\max|\Delta e_2^{12}|$ are for example such that they bound above the absolute values of the differential measurement errors in a majority of cases.

Moreover it is noted that the absolute value of the difference in path length $d^{12}$ cannot physically be greater than a distance between the radioelectric centers of the reception antennas $R_1$ and $R_2$, termed the characteristic distance $L^{12}$, which value is obtained when the transmitter device 4 is in the direction defined by the radioelectric centers of the two reception antennas.

Therefore, according to expression (5), by bounding above the differential errors of linear phase measurement $\Delta e_1^{12}$ and $\Delta e_2^{12}$ by the upper bounds $\max|\Delta e_1^{12}|$ and $\max|\Delta e_2^{12}|$, and the absolute value of the difference in path length $d^{12}$ by the distance $L^{12}$, it is deduced that the value $\Delta \hat{N}_{WL}^{12}$ is equal to $\Delta N_{WL}^{12}$ if the receiver device 3 and the radioelectric signals satisfy the following condition:

$$L^{12} < \frac{\lambda_1 \lambda_2}{|P\lambda_2 - Q\lambda_1|}\left(\frac{1}{2} - \frac{|P|}{\lambda_1}\max|\Delta e_1^{12}| - \frac{|Q|}{\lambda_2}\max|\Delta e_2^{12}|\right) \qquad (6)$$

Condition (6) is obtained through choices of essential characteristics of the determining system 1.

In the case where the differential errors of linear phase measurement and the upper bounds are negligible, condition (6) becomes:

$$L^{12} < \frac{\lambda_1 \lambda_2}{2|P\lambda_2 - Q\lambda_1|} = \frac{|\lambda_{WL}^{12}|}{2} \qquad (7)$$

A first estimation $d_{WL}^{12}$ of the difference in path length $d^{12}$ is obtained in the course of a fourth step 64 of the determining method 6, by substituting the value $\Delta \hat{N}_{WL}^{12}$ into the expression (4) for the virtual phase difference $\Delta \tilde{\phi}_{WL}^{12}$:

$$d_{WL}^{12}=\Delta \tilde{\phi}_{WL}^{12}+\lambda_{WL}^{12}\Delta \hat{N}_{WL}^{12} \qquad (8)$$

In the case where $\Delta \hat{N}_{WL}^{12}=\Delta N_{WL}^{12}$, it is deduced from (4) that the first estimation $d_{WL}^{12}$ is equal to the difference in path length $d^{12}$ to within the differential measurement errors $\Delta e_{WL}^{12}$:

$$d_{WL}^{12}=d^{12}+\Delta e_{WL}^{12} \qquad (9)$$

In a particular mode of implementation, the determining method 6 comprises a fifth step 65 and a sixth step 66, in which steps at least one second estimation of the difference in path length is obtained on the basis of the measurements $\Delta \tilde{\phi}_1^{12}$ and/or $\Delta \tilde{\phi}_2^{12}$ of differences of linear phase, and of the first estimation $d_{WL}^{12}$ of the difference in path length.

The first estimation $d_{WL}^{12}$ is not in practice of sufficient accuracy to obtain an accurate measurement of the angle of sight θ, but it is used to resolve the ambiguity at the level of said differences of linear phase.

In the course of the fifth step 65 and for at least one wavelength $\lambda_n$, $1 \leq n \leq 2$, a value $\Delta \hat{N}_n^{12}$ of the ambiguity $\Delta N_n^{12}$ is first of all obtained by calculating the following expression:

$$\Delta \hat{N}_n^{12} = R\left(\frac{-\Delta \tilde{\phi}_n^{12} + \hat{d}_{WL}^{12}}{\lambda_n}\right) \qquad (10)$$

It is deduced from (2) and (9) that the value $\Delta \hat{N}_n^{12}$ is equal to the ambiguity $\Delta N_n^{12}$ of the measurement $\Delta \tilde{\phi}_n^{12}$ of linear phase difference if the following condition is satisfied:

$$|A\Delta e_1^{12}-B\Delta e_2^{12}-\Delta e_n^{12}|<\lambda_n/2 \qquad (11)$$

By considering the wavelength $\lambda_1$, expression (11) becomes:

$$|(A-1)\Delta e_1^{12} - B\Delta e_2^{12}| = \left|\frac{Q\lambda_1}{P\lambda_2 - Q\lambda_1}\Delta e_1^{12} - \frac{Q\lambda_1}{P\lambda_2 - Q\lambda_1}\Delta e_2^{12}\right| < \lambda_{1/2}$$

By bounding above the differential errors of linear phase measurement $\Delta e_1^{12}$ and $\Delta e_2^{12}$ by the upper bounds $\max|\Delta e_1^{12}|$ and $\max|\Delta e_2^{12}|$, it is deduced that the value $\Delta \hat{N}_n^{12}$ is equal to $\Delta N_n^{12}$ if said upper bounds and the radioelectric signals satisfy the following condition:

$$\max|\Delta e_1^{12}| + \max|\Delta e_2^{12}| < \frac{|P\lambda_2 - Q\lambda_1|}{2|Q|} \qquad (12)$$

By considering the wavelength $\lambda_2$, condition (12) becomes:

$$\max|\Delta e_1^{12}| + \max|\Delta e_2^{12}| < \frac{|P\lambda_2 - Q\lambda_1|}{2|P|} \qquad (13)$$

Conditions (12) and (13) are obtained through choices of essential characteristics of the determining system 1.

In the sixth step 66 of the determining method 6, the value $\Delta \hat{N}_n^{12}$ of the ambiguity $\Delta N_n^{12}$ is thereafter substituted into the expression (2) for the measurement $\Delta \tilde{\phi}_n^{12}$ of linear phase difference to obtain a second estimation $d_n^{12}$ of the difference in path length $d^{12}$:

$$d_n^{12}=\Delta \tilde{\phi}_n^{12}+\lambda_n \Delta \hat{N}_n^{12}.$$

In the case where $\Delta \hat{N}_n^{12}=\Delta N_n^{12}$, it is deduced from (2) that the second estimation $d_n^{12}$ is equal to the difference in path length $d^{12}$ to within the linear phase measurement differential error $\Delta e_n^{12}$:

$$d_n^{12}=d^{12}+\Delta e_n^{12}.$$

The second estimation $d_n^{12}$ thus obtained is on average more accurate than the first estimation $d_{WL}^{12}$ because the differential measurement error $\Delta e_n^{12}$ is on average less than the error $\Delta e_{WL}^{12}$.

In a similar mode of implementation of the fifth step 65 and of the sixth step 66, levels of the differential measurement errors in the measurements $\Delta \tilde{\phi}_n^{12}$ of differences of linear phase are estimated for the two wavelengths, and a value $\Delta \hat{N}_n^{12}$ and a second estimation $d_n^{12}$ are calculated solely for the wavelength for which the estimated level of the differential measurement error is smallest.

In another similar mode of implementation of the fifth step 65 and of the sixth step 66, a value $\Delta \hat{N}_n^{12}$ and a second estimation $d_n^{12}$ are obtained for each wavelength of the radioelectric signals.

A third estimation $d^{12}$ is for example calculated by averaging said two estimations $d_n^{12}$ or by performing a so-called least squares estimation, on the basis of at least two estimations of the difference in path length $d^{12}$ (out of $d_{WL}^{12}$, $d_1^{12}$ and/or $d_2^{12}$) and of an estimation of the levels of the differential errors of linear phase measurement (respectively $\Delta e_{WL}^{12}$, $\Delta e_1^{12}$ and/or $\Delta e_2^{12}$).

In a preferred mode of implementation, the determining method 6 also comprises a seventh step 67 in which a filtering is performed to reduce the level of the differential measurement noise, included in the differential measurement error.

The filtering is performed on values of the difference in path length $d^{12}$ that are estimated successively during a nonzero time window on the basis of a succession of phase measurements, and corresponds for example to a mean of said successive values in a static case where the variations in the angle of sight $\theta$ are negligible during said time window, or to a filtering taking account of a model of variation of said angle of sight in the converse case.

In an eighth step 68 of the determining method 6, a value of the angle of sight $\theta$ is calculated.

As is illustrated in FIG. 2, the angle of sight $\theta$ is related to the difference in path length $d^{12}$ of the radioelectric signals between the two antennas by the relation $d^{12}=L^{12} \cos \theta$.

The value of the angle of sight $\theta$ is therefore obtained in the course of said eighth step on the basis of an estimation of the difference in path length $d^{12}$ and of the above relation by applying known methods.

According to the mode of implementation of said method, said eighth step is executed either after the fourth step 64 (on the basis of $d_{WL}^{12}$), or after the sixth step 66 (on the basis of $d^{12}$ or $d_n^{12}$), or after the seventh step 67 (on the basis of a filtered value).

In a particular mode of implementation, the determining method 6 is iterative, and estimations $\Delta \hat{b}_n^{12}$ of the linear phase differential measurement biases are calculated at least for the part which depends on the angle of sight by using the value of said angle of sight obtained at the eighth step 68, at least on the basis of the angular-phase responses of the reception antennas previously established by calibration.

In this mode of implementation, the steps of the determining method 6 are again executed:

either from the second step 62, in which case estimations $\Delta \hat{b}_n^{12}$ of the differential measurement biases are calculated for the two wavelengths, and the two measurements $\Delta \tilde{\phi}_n^{12}$ of differences of linear phase are replaced with measurements of differences of linear phase after correction $\Delta \tilde{\phi}_n^{12} - \Delta \hat{b}_n^{12}$, or from the fifth step 65, in which case at least one estimation $\Delta \hat{b}_n^{12}$ is calculated for at least one wavelength and the at least one measurement $\Delta \tilde{\phi}_n^{12}$ of corresponding linear phase difference is replaced with $\Delta \tilde{\phi}_n^{12} - \Delta \hat{b}_n^{12}$.

By iterating the determining method 6, the values of the angle of sight $\theta$ are increasingly accurate, and the number of iterations is chosen, for example by simulation, to ensure a satisfactory mean accuracy for the envisaged application.

It should be noted that the steps of the method are also applicable on the basis of measurements $\Delta \phi_n^{12}$ of differences of angular phase $\Delta \phi_n^{12} = 2\pi \Delta \phi_n^{12}/\lambda_n$ or on the basis of other phase measurements, proportional to the measurements $\Delta \tilde{\phi}_n^{12}$ of differences of linear phase $\Delta \phi_n^{12}$, by introducing the proportionality coefficients into the equations used in the various steps of the determining method 6. More generally, the steps of the method are executed as follows:

a) first step 61: determination for each wavelength $\lambda_n$, n=1 and 2, of a measurement $\Delta \tilde{\psi}_n^{12}$ of a phase difference $\Delta \psi_n^{12}$ equal to $C_n \Delta \phi_n^{12}$, where $C_n$ is a nonzero real factor which depends on the chosen implementation and does not modify the result of the determining method 6 (the measurement $\Delta \tilde{\psi}_n^{12}$ is equal to $C_n \Delta \tilde{\phi}_n^{12}$; for example if $C_n=1$, the measurement $\Delta \tilde{\psi}_n^{12}$ is equal to the measurement $\Delta \tilde{\phi}_n^{12}$ of linear phase difference; if $C_n=2\pi/\lambda_n$, the measurement $\Delta \tilde{\psi}_n^{12}$ is equal to the measurement $\Delta \tilde{\phi}_n^{12}$ of angular phase difference);

b) second step 62: determination of a virtual phase difference $\Delta \tilde{\psi}_{WL}^{12}$ by linear combination of the measurements $\Delta \tilde{\psi}_n^{12}$ of phase differences determined for each wavelength $\lambda_n$, expressed in the following form:

$$\Delta \tilde{\psi}_{WL}^{12} = D\left(\frac{P}{C_1 \lambda_1}\Delta \tilde{\psi}_1^{12} - \frac{Q}{C_2 \lambda_2}\Delta \tilde{\psi}_2^{12}\right),$$

where D denotes a nonzero real factor which depends on the chosen implementation and does not modify the result of the determining method 6 (for example $D=\lambda_{WL}^{12}$ in the case described previously for the measurements $\Delta \tilde{\phi}_n^{12}$ of differences of linear phase; $D=2\pi$ in the case of measurements $\Delta \tilde{\phi}_n^{12}$ of differences of angular phase);

c) third step 63: determination of a value $\Delta \hat{N}_{WL}^{12}$ of the ambiguity of the virtual phase difference $\Delta \tilde{\psi}_{WL}^{12}$ by rounding—$\Delta \tilde{\psi}_{WL}^{12}/D$ to the closest integer;

d) fourth step 64: determination of a first estimation $d_{WL}^{12}$ expressed in the form:

$$\hat{d}_{WL}^{12} = \frac{\lambda_{WL}^{12}}{D}(\Delta \tilde{\psi}_{WL}^{12} + D\Delta \hat{N}_{WL}^{12});$$

e) fifth step 65: determination of at least one estimation $\Delta \hat{N}_n^{12}$, n=1 and/or 2, expressed in the form:

$$\Delta \hat{N}_n^{12} = R\left(\frac{-\Delta \tilde{\psi}_n^{12} + C_n \hat{d}_{WL}^{12}}{\lambda_n C_n}\right);$$

f) sixth step 66: determination of at least one second estimation $d_n^{12}$, n=1 and/or 2, of the difference in path length $d^{12}$, expressed in the form:

$$\hat{d}_n^{12} = \frac{(\Delta \tilde{\psi}_n^{12} + \lambda_n C_n \Delta \hat{N}_n^{12})}{C_n}$$

g) seventh step 67: the filtering is as previously performed on values of the difference in path length $d^{12}$ estimated successively during a nonzero time window;

h) eighth step 68: determination as described previously of a value of the sought-after angle of sight $\theta$.

In the modes of implementation of the determining method in which a correction of differential measurement biases is performed, an estimation $\Delta \hat{\beta}_n^{12}$ of a differential measurement bias $\Delta \beta_n^{12} = C_n \Delta b_n^{12}$ in the measurement $\Delta \tilde{\psi}_n^{12}$ of phase difference is calculated for at least one wavelength $\lambda_n$, n=1 and/or 2, and the steps of said method are applied by considering at least one measurement of phase difference after correction $\Delta\tilde{\psi}_n^{12} - \Delta\hat{\beta}_n^{12}$, n=1 and/or 2.

In the more general case of an application of the determining method 6 to a receiver device 3 comprising a number of reception antennas $N_R$ greater than two and nonaligned, said receiver device comprises $C_{N_R}^2 = N_R!/2!$ antenna bases ($R_m$, $R_l$) with characteristic distances $L^{ml}$, $1 \leq m \leq l \leq N_R$. In this case, differences in path length $d^{ml}$ are estimated for at least two antenna bases by applying the corresponding steps of the determining method 6, optionally with different parameters P and Q for each antenna base considered.

In a first mode of implementation of the eighth step 68 of the determining method 6, a value of an angle of sight is calculated for each estimation of difference in path length $d^{ml}$, $1 \leq m \leq l \leq N_R$. In a preferential manner, the angles of azimuth $\phi$ and of elevation $\theta$ of the line of sight are thereafter determined on the basis of all the values of the angles of sight, by known geometric calculations.

In a second mode of implementation of the eighth step 68 of said determining method, the angles of azimuth $\phi$ and of elevation $\theta$ are calculated directly on the basis of the estimations of the differences in path length $d^{ml}$, $1 \leq m < l \leq N_R$, by utilizing the relation:

$$\begin{pmatrix} d^{12} \\ \vdots \\ d^{ml} \end{pmatrix} = H \begin{pmatrix} \sin\theta\cos\varphi \\ \sin\theta\sin\varphi \\ \cos\theta \end{pmatrix}$$

In this expression, H is a matrix comprising at most $C_{N_R}^2$ rows and three columns and whose coefficients depend on the distances $L^{ml}$, $1 \leq m < l \leq N_R$, and the positions in the frame 5 of the reception antennas $R_m$, $1 \leq m \leq N_R$.

The matrix H for the example represented in FIG. 1 is, having regard to the positions of the reception antennas in the frame 5, equal to:

$$H = \begin{pmatrix} 0 & 0 & L^{12} \\ 0 & -L^{13} & 0 \\ 0 & -L^{13} & -L^{12} \end{pmatrix}$$

In the case of an application of the determining method 6 in a determining system 1 in which the transmitter device transmits a number of wavelengths $N_L$ greater than two, virtual wavelengths $\lambda_{WL}^{nk}$ are considered for at least two wavelength pairs $(\lambda_n, \lambda_k)$, $1 \leq n < k \leq N_L$. For each antenna pair ($R_m$, $R_l$) considered, an estimation of the difference in path length $d^{ml}$ is obtained for each virtual wavelength $\lambda_{WL}^{nk}$. A single estimation of the difference in path length $d^{ml}$ is determined for example on the basis of the estimations obtained for the various virtual wavelengths considered, either by least squares, or by averaging said estimations.

Figure 4:
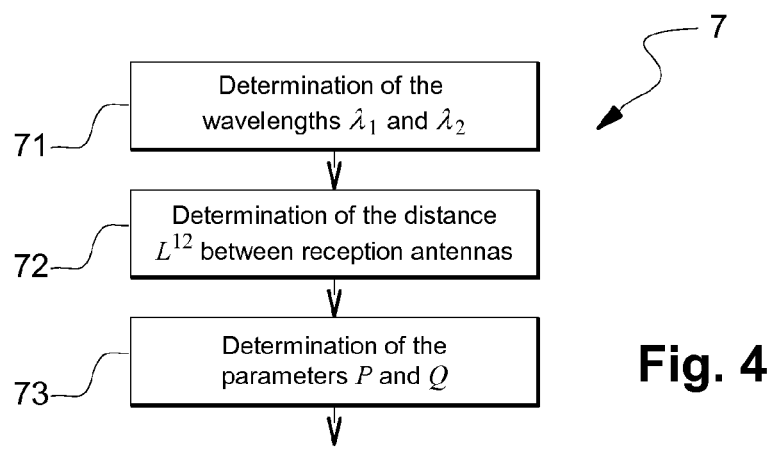

The design method 7, represented in FIG. 4, is used to determine essential characteristics of a system 1 for determining angles of sight for which the ambiguities in the phase measurements are resolved in the case of an application of the determining method 6 according to the aspects of the disclosed embodiments.

The design method 7 is described initially for the design of a determining system 1 comprising two wavelengths $\lambda_1$ and $\lambda_2$ and two reception antennas $R_1$ and $R_2$. The essential characteristics of said system are the values of the wavelengths $\lambda_1$ and $\lambda_2$, of the characteristic distance $L^{12}$ of the base of antennas, and of the pair (P,Q) of nonzero integers which are used in the determining method 6.

The essential characteristics are therefore classed into three groups: wavelengths ($\lambda_1$ and $\lambda_2$), characteristic distances of antenna bases ($L^{12}$), and parameters of the determining method 6 (P and Q).

In a first step 71 of said design method, the two wavelengths $\lambda_1$ and $\lambda_2$ of the radioelectric signals are chosen.

The two frequencies corresponding to the two wavelengths $\lambda_1$ and $\lambda_2$ are for example chosen in an allocated band of frequencies which can be imposed by the national and/or international regulations for the type of application targeted. The frequencies are for example chosen in the S band, which corresponds to the range of frequencies from 2 GHz to 4 GHz, or are such that one of the wavelengths is equal to the wavelength of commercial GPS.

In a second step 72 of the design method 7, the distance $L^{12}$ between the two reception antennas of the receiver device 3 is determined by taking account for example of the operational constraints and of the dimensions of the receiver device 3.

In a third step 73 of the design method, the pair of parameters (P,Q) is determined so that the following conditions are satisfied:

$$L^{12} < \frac{\lambda_1 \lambda_2}{2|P\lambda_2 - Q\lambda_1|}, \qquad (14)$$

$$P\lambda_2 \neq Q\lambda_1.$$

By considering expressions (14) and (7), it is seen that the ambiguity identified in the description of the third step 63 of the determining method 6 is resolved in the case where the differential errors of linear phase measurement are negligible.

In a particular mode of implementation of the design method 7, estimations $\max|\Delta\hat{e}_1^{12}|$ and $\max|\Delta\hat{e}_2^{12}|$ of the upper bounds $\max|\Delta e_1^{12}|$ and $\max|\Delta e_2^{12}|$ of the absolute values of the differential errors of linear phase measurement $\Delta e_1^{12}$ and $\Delta e_2^{12}$ are determined by theory, simulation or experimentation.

The estimated upper bounds correspond to the upper bounds of the absolute values of the differential errors of linear phase measurement $\Delta e_1^{12}$ and $\Delta e_2^{12}$ in the measurements $\Delta\tilde{\phi}_n^{12}$ of differences of linear phase that are used at the level of the second step 62 of the determining method 6. In the case where said determining method is iterative, only the first execution of the second step 62 is considered.

The estimations $\max|\Delta\hat{e}_1^{12}|$ and $\max|\Delta\hat{e}_2^{12}|$ are obtained by bounding above the absolute values of the linear phase differential measurement biases $\Delta b_1^{12}$ and $\Delta b_2^{12}$ and/or of the linear phase differential measurement noise $\Delta \epsilon_1^{12}$ and $\Delta \epsilon_2^{12}$.

In the case of the differential measurement biases $\Delta b_1^{12}$ and $\Delta b_2^{12}$, the estimations $\max|\Delta\hat{e}_1^{12}|$ and $\max|\Delta\hat{e}_2^{12}|$ are calculated at least on the basis of the angular-phase responses of the two reception antennas $R_1$ and $R_2$ of the receiver device 3 which are previously established, for example by calibration.

The differential measurement noises $\Delta\epsilon_1^{12}$ and $\Delta\epsilon_2^{12}$ are not necessarily bounded, and in this case the estimations $\max|\Delta\hat{e}_1^{12}|$ and $\max|\Delta\hat{e}_2^{12}|$ are for example chosen to be equal to estimations of the standard deviations of said noise multiplied by integer numbers, said integer numbers being such that the differential measurement noises $\Delta\epsilon_1^{12}$ and $\Delta\epsilon_2^{12}$ are bounded above by the estimations $\max|\Delta\hat{e}_1^{12}|$ and $\max|\Delta\hat{e}_2^{12}|$ in a majority of cases, for example in 99% of cases.

In this mode of implementation, the parameters P and Q are determined so that $P\lambda_2 \neq Q\lambda_1$ and that:

$$L^{12} < \frac{\lambda_1 \lambda_2}{|P\lambda_2 - Q\lambda_1|}\left(\frac{1}{2} - \frac{|P|}{\lambda_1}\max|\Delta \hat{e}_1^{12}| - \frac{|Q|}{\lambda_2}\max|\Delta \hat{e}_2^{12}|\right) \quad (15)$$

By considering expressions (15) and (6), it is seen that the ambiguity identified for the third step 63 of the determining method 6 is resolved, in the case where the differential errors of linear phase measurement are not negligible.

By considering a maximum upper bound $\max|\Delta \hat{e}^{12}|$ equal to the larger of the two estimations $\max|\Delta \hat{e}_1^{12}|$ and $\max|\Delta \hat{e}_2^{12}|$ expression (15) becomes:

$$L^{12} < \frac{\lambda_1 \lambda_2}{2|P\lambda_2 - Q\lambda_1|} - \frac{(|P|\lambda_2 + |Q|\lambda_1)}{|P\lambda_2 - Q\lambda_1|}\max|\Delta \hat{e}^{12}| \quad (16)$$

Variants of the design method 7 consist of a permutation of the first 71, second 72 and third 73 steps.

Thus, the essential characteristics corresponding to two of the groups in which said essential characteristics are classed are firstly determined, and then the essential characteristics corresponding to the last group (that is to say either the wavelengths $\lambda_1$ and $\lambda_2$, or the characteristic distance of the base of antennas $L^{12}$, or the pair of nonzero integers P and Q) are determined so that $P\lambda_2 \neq Q\lambda_1$ and that one at least of the three above conditions (14), (15) and (16) is satisfied.

In a similar mode of implementation of the design method 7, essential characteristics corresponding to a group are firstly chosen (that is to say either the wavelengths $\lambda_1$ and $\lambda_2$, or the characteristic distance of the base of antennas $L^{12}$, or the pair of nonzero integers P and Q), then the essential characteristics corresponding to the last two groups are determined jointly so that $P\lambda_2 \neq Q\lambda_1$ and that one at least of the three above conditions (14), (15) and (16) is satisfied.

In a preferred mode of implementation of the design method 7, the essential characteristics are furthermore chosen so that one at least of the following relations is satisfied:

$$\max|\Delta \hat{e}_1^{12}| + \max|\Delta \hat{e}_2^{12}| < \frac{|P\lambda_2 - Q\lambda_1|}{2|Q|} \quad (17a)$$

$$\max|\Delta \hat{e}_1^{12}| + \max|\Delta \hat{e}_2^{12}| < \frac{|P\lambda_2 - Q\lambda_1|}{2|P|} \quad (17b)$$

In this case, by considering expressions (17a), (17b), (12) and (13), it is seen that the ambiguity identified for the fifth step 65 of the determining method 6 is resolved in the case where the linear phase measurement errors are not negligible.

By considering the maximum upper bound $\max|\Delta \hat{e}^{12}|$, and by considering the larger integer $\max(|P|,|Q|)$ of the pair of nonzero integers P and Q, expressions (17a) and (17b) become:

$$\max|\Delta \hat{e}^{12}| < \frac{|P\lambda_2 - Q\lambda_1|}{4 \cdot \max(|P|, |Q|)} \quad (18)$$

In the case of a design of a determining system 1 in which the receiver device 3 comprises a number $N_R$ greater than two of reception antennas, the design method 7 applies the previous conditions for at least two antenna pairs. Estimations of upper bounds and/or a maximum upper bound are calculated for each antenna pair considered, and are used under the previous conditions.

In the case of a design of a determining system 1 in which the transmitter device 4 transmits a number $N_L$ greater than two of wavelengths, the design method 7 applies the previous conditions for at least two wavelength pairs and for each antenna pair considered.

The disclosed embodiments also relate to the receiver device 3, in the case where it applies the determining method 6.

As previously described, the receiver device 3 comprises $N_R$ reception antennas $R_1$ to $R_{N_R}$, $N_R$ being greater than or equal to two. Said reception antennas preferably have substantially identical attitudes and have similar characteristics, so that for a given line of sight the angular-phase responses of said reception antennas are substantially identical, so that a maximum differential bias of angular phase between said antennas is relatively small, for example less than or equal to 5°.

The receiver device 3 furthermore comprises means for the measurement of the angular phases of the radioelectric signals received on the $N_R$ reception antennas, and/or for determining angular phase differences between the various pairs of reception antennas, on the basis of which the measurements $\Delta\psi_n^{ml}$, $1 \leq m < l \leq N_R$, $1 \leq n \leq N_L$, are determined. The angular phase differences of the radioelectric signals are for example measured directly at the level of the reception antennas, or at the level of the radioelectric stages of said antennas, or else determined in baseband after analog to digital conversion of said radioelectric signals.

The receiver device 3 also comprises means for the calculation of the various steps of the determining method 6, for example electronic components such as processors and memories linked by data buses.

In the case of a determining system 1 where a device is both a transmitter and receiver, said device comprises $N_R$ reception antennas and at least one antenna able to transmit which is, in an economical embodiment, also one of the reception antennas.

The aspects of the disclosed embodiments also relate to the system 1 for determining angles of sight comprising the receiver device 3 and at least one transmitter device 4 transmitting the radioelectric signals comprising the $N_L$ different wavelengths $\lambda_n$, $1 \leq n \leq N_L$.

In a particular embodiment, the $N_L$ different wavelengths $\lambda_n$, $1 \leq n \leq N_L$ are compatible with radioelectric signals transmitted by a satellite global navigation system such as the GPS system. The term compatible is understood to mean that the radioelectric signals transmitted by the transmitter device do not create any interference on the radioelectric signals of the satellite global navigation system, or may be regarded as akin to said radioelectric signals of the satellite global navigation system.

In another particular embodiment, the transmitter device comprises a pseudolite.

In an embodiment of the determining system 1, said determining system comprises at least two transmitter devices whose angles of sight with respect to the receiver device 3 are substantially different, that is to say spaced apart by at least some ten degrees, and relative positions of said receiver device with respect to said at least two transmitter devices are known a priori in a reference frame, such as the frame 5 or a terrestrial frame. The determining system 1 is thus able to determine, on the basis of said relative positions and of estimations of the angles of sight obtained by applying the determining method 6, an orientation of at least one base of reception antennas of said receiver device 3 in said reference frame. This determination implements known methods.

Preferably, the at least two transmitter devices 4 are embedded in satellites of a satellite global navigation system, and the receiver device 3 is embedded in a vehicle comprising at least one receiver of the satellite global navigation system.

The relative positions of the receiver device 3 with respect to the at least two transmitter devices are in this case preferably obtained from the at least one receiver of the satellite global navigation system.

In a similar embodiment of the determining system 1 in which the receiver device 3 comprises at least three non-aligned reception antennas, the lines of sight of the at least two transmitter devices are determined by applying the determining method 6 according to the aspects of the disclosed embodiments, thus permitting the determination of the attitude of said receiver device with respect to the reference frame.

The aspects of the disclosed embodiments therefore makes it possible to design a system for determining angles of sight for which an angle of sight is determined by using a particularly inexpensive configuration comprising two reception antennas and two wavelengths. The determining method applied is based on phase measurements on which an ambiguity is furthermore resolved by appropriate dimensioning of said determining system.

The invention claimed is:

1. A method comprising:
determining at least one angle of sight ($\theta$) between a receiver device comprising at least two reception antennas ($R_1, R_2$), and at least one transmitter device comprising at least one antenna for transmitting radioelectric signals on at least two different wavelengths $\lambda_1$ and $\lambda_2$ configured to be received by the at least two reception antennas of said receiver device by:

using the receiver device to estimate at least one difference in path length of the radioelectric signals between the two reception antennas ($R_1, R_2$) of a base of antennas so as to determine said at least one angle of sight, and using the receiver device to determine for each wavelength $\lambda_p$ considered, p=1 and 2, a measurement $\Delta\tilde{\psi}_p^{12}$ of phase difference $C_p \Delta\phi_p^{12}$ between the two reception antennas ($R_1, R_2$), where $C_p$ denotes a nonzero real number and $\Delta\phi_p^{12}$ denotes a linear phase difference, dimensionally equivalent to a distance by:
determining a virtual phase difference $\Delta\tilde{\psi}_{WL}^{12}$ between the two reception antennas ($R_1, R_2$) by linear combination of the measurements $\Delta\tilde{\psi}_p^{12}$ of phase differences determined for each wavelength $\lambda_p$, expressed in the form:

$$\Delta\tilde{\psi}_{WL}^{12} = D\left(\frac{P}{C_1\lambda_1}\Delta\tilde{\psi}_1^{12} - \frac{Q}{C_2\lambda_2}\Delta\tilde{\psi}_2^{12}\right),$$

where D denotes a nonzero real number, P and Q are nonzero integers such that $P\lambda_2 \neq Q\lambda_1$,
determining an integer value $\Delta\hat{N}_{WL}^{12}$ of an ambiguity of the virtual phase difference $\Delta\tilde{\psi}_{WL}^{12}$, equal to:

$$\Delta\hat{N}_{WL}^{12} = R(-\Delta\tilde{\psi}_{WL}^{12}/D),$$

where R(x) denotes the integer closest to x, and determining a first estimation $d_{WL}^{12}$ of the at least one difference in path length, equal to:

$$\hat{d}_{WL}^{12} = \frac{\lambda_{WL}^{12}}{D}(\Delta\tilde{\psi}_{WL}^{12} + D\Delta\hat{N}_{WL}^{12}),$$

where $\lambda_{WL}^{12}$ is a virtual wavelength equal to $\lambda_1\lambda_2/(P\lambda_2 - Q\lambda_1)$.

2. The method as claimed in claim 1 comprising using the receiving device for:
determining at least one integer value $\Delta\hat{N}_p^{12}$ of an ambiguity of the measurement $\Delta\tilde{\psi}_p^{12}$ of phase difference of a wavelength $\lambda_p$, p=1 and/or 2, equal to:

$$\Delta\hat{N}_p^{12} = R\left(\frac{-\Delta\tilde{\psi}_p^{12} + C_p \hat{d}_{WL}^{12}}{\lambda_p C_p}\right), \text{ and}$$

determining at least one second estimation $d_p^{12}$, p=1 and/or 2, of the at least one difference in path length, equal to:

$$\hat{d}_p^{12} = \frac{(\Delta\tilde{\psi}_p^{12} + \lambda_p C_p \Delta\hat{N}_p^{12})}{C_p}.$$

3. The method as claimed in claim 2, comprising using the receiving device for determining an estimation of the at least one difference in path length of the radioelectric signals between the two reception antennas ($R_1, R_2$) by least squares on the basis of at least two estimations of said at least one difference in path length from among the estimations $d_{WL}^{12}$, $d_1^{12}$, $d_2^{12}$ and of an estimation of a level of errors present in said estimations.

4. The method as claimed in claim 2, wherein the receiving device is configured to estimate a level of errors present in the measurement $\Delta\tilde{\psi}_p^{12}$ of phase difference for each wavelength $\lambda_p$, p=1 and 2, and to calculate the second estimation $d_p^{12}$ of the at least one difference in path length of the radioelectric signals between the two reception antennas ($R_1, R_2$) solely on the basis of the measurement $\Delta\tilde{\psi}_p^{12}$, p=1 or 2, of phase difference for which the estimated level of errors is smallest.

5. The method as claimed in claim 1, wherein the receiving device is configured to filter successive estimated values of the at least one difference in path length obtained on the basis of a succession of measurements of phase differences.

6. The method as claimed in claim 1, in which an estimation $\Delta\hat{\beta}_p^{12}$ of a differential measurement bias $\Delta\beta_p^{12}$ in the measurement $\Delta\tilde{\psi}_p^{12}$ of phase difference, equal to $C_p\Delta b_p^{12}$ where $\Delta b_p^{12}$ denotes a linear phase differential measurement bias, is previously established by the receiving device by theory or simulation or experimentation for at least one wavelength $\lambda_p$, p=1 and/or 2, and the method includes using the receiving device for considering at least one measurement of phase difference after correction $\Delta\tilde{\psi}_p^{12} - \Delta\hat{\beta}_p^{12}$, p=1 and/or 2.

7. The method as claimed in claim 1, in which an estimation $\Delta\hat{\beta}_p^{12}$ of a differential measurement bias $\Delta\beta_p^{12}$ in the measurement $\Delta\tilde{\psi}_p^{12}$ of phase difference, equal to $C_p\Delta b_p^{12}$ where $\Delta b_p^{12}$ denotes a linear phase differential measurement bias, is determined by the receiving device for at least one wavelength $\lambda_p$, p=1 and/or 2, at least on the basis of angular-phase responses of the two reception antennas ($R_1, R_2$) previously determined by theory or simulation or experimentation, and of at least one value of an angle of sight determined on the basis of an estimation of the at least one difference in path length, and the method further comprises using the receiving device for considering at least one measurement of phase difference after correction $\Delta\tilde{\psi}_p^{12} - \Delta\hat{\beta}_p^{12}$, p=1 and/or 2.

8. The method as claimed in claim 7, wherein the receiving device is configured to iterate the method at least twice, wherein at least one estimation $\Delta\hat{\beta}_p^{12}$, p=1 and/or 2, is calculated for each iteration of said method and the method is applied for each iteration of said method by considering at least one measurement of phase difference after correction $\Delta\tilde{\psi}_p^{12} - \Delta\hat{\beta}_p^{12}$, p=1 and/or 2.

9. The method as claimed in claim 1, wherein the receiving device is configured to choose the nonzero integers P and Q so that the rational number P/Q is close to the ratio of the wavelengths $\lambda_1/\lambda_2$.

10. The method as claimed in claim 1, further comprising using the receiving device for determining the essential characteristics of a system for determining at least one angle of sight ($\theta$), wherein said essential characteristics are at least:
  a value of a distance $L^{12}$ between the two reception antennas ($R_1, R_2$) of the base of antennas considered to estimate the at least one difference in path length,
  values of the two wavelengths $\lambda_1, \lambda_2$,
  values of the pair of nonzero integers P and Q,
  defining three groups of essential characteristics, in which said method the essential characteristics are determined so that the following condition is satisfied:

$$L^{12} < \frac{\lambda_1 \lambda_2}{2|P\lambda_2 - Q\lambda_1|}.$$

11. The method as claimed in claim 10, in which wherein the receiving device is configured to:
  determine estimations $\max|\Delta\hat{e}_p^{12}|$ of upper bounds of absolute values of differential errors of linear phase measurement between the two reception antennas ($R_1, R_2$) of the base of antennas or each wavelength $\lambda_p$, p=1 and 2, by theory or simulation or experimentation, define a maximum upper bound $\max|\Delta\hat{e}^{12}|$ equal to the largest of the estimations $\max|\Delta\hat{e}_p^{12}|$ and choose the essential characteristics so that at least one of the following conditions is satisfied:

$$L^{12} < \frac{\lambda_1 \lambda_2}{|P\lambda_2 - Q\lambda_1|}\left(\frac{1}{2} - \frac{|P|}{\lambda_1}\max|\Delta\hat{e}_1^{12}| - \frac{|Q|}{\lambda_2}\max|\Delta\hat{e}_2^{12}|\right),$$

$$L^{12} < \frac{\lambda_1 \lambda_2}{2|P\lambda_2 - Q\lambda_1|} - \frac{(|P|\lambda_2 + |Q|\lambda_1)}{|P\lambda_2 - Q\lambda_1|}\max|\Delta\hat{e}^{12}|.$$

12. The method as claimed in claim 11, in which the essential characteristics are chosen so that at least one of the following conditions is satisfied:

$$\max|\Delta\hat{e}_1^{12}| + \max|\Delta\hat{e}_2^{12}| < \frac{|P\lambda_2 - Q\lambda_1|}{2|P|},$$

$$\max|\Delta\hat{e}_1^{12}| + \max|\Delta\hat{e}_2^{12}| < \frac{|P\lambda_2 - Q\lambda_1|}{2|Q|},$$

$$\max|\Delta\hat{e}^{12}| < \frac{|P\lambda_2 - Q\lambda_1|}{4 \cdot \max(|P|, |Q|)}.$$

13. The method as claimed in claim 11, in which the estimations $\max|\Delta\hat{e}_p^{12}|$ are determined at least on the basis of angular-phase responses of the two reception antennas ($R_1, R_2$) of the base of antennas and/or on the basis of estimations of standard deviations of measurement noise.

14. The method as claimed in claim 10, in which the essential characteristics corresponding to two groups of essential characteristics are firstly determined, and then the essential characteristics corresponding to the last group of essential characteristics are determined.

15. The method as claimed in claim 10, in which the essential characteristics corresponding to a group of essential characteristics are firstly determined, and then the essential characteristics corresponding to the last two groups of essential characteristics are determined.

16. The receiver device for determining at least one angle of sight ($\theta$) using the method claimed in claim 1, configured to satisfy at least one of the following conditions for the base of antennas:

$$L^{12} < \frac{\lambda_1 \lambda_2}{2|P\lambda_2 - Q\lambda_1|},$$

$$L^{12} < \frac{\lambda_1 \lambda_2}{|P\lambda_2 - Q\lambda_1|}\left(\frac{1}{2} - \frac{|P|}{\lambda_1}\max|\Delta\hat{e}_1^{12}| - \frac{|Q|}{\lambda_2}\max|\Delta\hat{e}_2^{12}|\right),$$

$$L^{12} < \frac{\lambda_1 \lambda_2}{2|P\lambda_2 - Q\lambda_1|} - \frac{(|P|\lambda_2 + |Q|\lambda_1)}{|P\lambda_2 - Q\lambda_1|}\max|\Delta\hat{e}^{12}|,$$

in which expressions $L^{12}$ is a characteristic distance of said base of antennas, $\max|\Delta\hat{e}_1^{12}|$ and $\max|\Delta\hat{e}_2^{12}|$ represent estimations of upper bounds of differential errors of linear phase measurement between said two reception antennas of said base of antennas, which are determined by theory or simulation or experimentation, and $\max|\Delta\hat{e}^{12}|$ is defined equal to the larger of the two estimations $\max|\Delta\hat{e}_1^{12}|$ and $\max|\Delta\hat{e}_2^{12}|$.

17. The receiver device as claimed in claim 16, configured to satisfy at least one of the following conditions:

$$\max|\Delta\hat{e}_1^{12}| + \max|\Delta\hat{e}_2^{12}| < \frac{|P\lambda_2 - Q\lambda_1|}{2|P|},$$

$$\max|\Delta\hat{e}_1^{12}| + \max|\Delta\hat{e}_2^{12}| < \frac{|P\lambda_2 - Q\lambda_1|}{2|Q|},$$

$$\max|\Delta\hat{e}^{12}| < \frac{|P\lambda_2 - Q\lambda_1|}{4 \cdot \max(|P|, |Q|)}.$$

18. The receiver device as claimed in claim 16, comprising at least three nonaligned reception antennas, and configured to calculate estimations of differences in path length for at least two antenna bases and to satisfy the conditions described for said at least two antenna bases.

19. The receiver device as claimed in claim 18, configured to determine an angle of sight ($\theta, \psi$) for each estimation of difference in path length, in a plane in space defined by the corresponding base of antennas and the transmitter device.

20. The receiver device as claimed in claim 19, configured to convert the angles of sight ($\theta, \psi$) into an angle of azimuth ($\phi$) and into an angle of elevation ($\theta$) in a frame tied to the receiver device.

21. The receiver device as claimed in claim 18, configured to determine an angle of azimuth ($\phi$) and an angle of elevation ($\theta$), defined in a frame tied to the receiver device, directly on the basis of the estimations of differences in path length.

22. The receiver device as claimed in claim 16, in which the reception antennas are designed to exhibit in a given direction substantially identical angular-phase responses so as to minimize phase differential biases.

23. A system for determining at least one angle of sight (θ) comprising a receiver device as claimed in claim 16, and comprising at least one transmitter device having at least one antenna for transmitting radioelectric signals on at least the two wavelengths $\lambda_1$, $\lambda_2$.

24. The determining system as claimed in claim 23 configured to transmit radioelectric signals by the at least one transmitter device that are compatible with radioelectric signals transmitted by a satellite global navigation system.

25. The determining system as claimed in claim 24, wherein the at least one transmitter device comprises a pseudolite.

26. The determining system as claimed in claim 23, comprising at least two transmitter devices whose angles of sight with respect to the receiver device are substantially different, wherein relative positions of said receiver device with respect to said at least two transmitter devices are known a priori in a reference frame, said determining system configured to determine, on the basis of said relative positions and of estimations of the angles of sight of said at least two transmitter devices, an orientation of the base of reception antennas of said receiver device in said reference frame.

27. The determining system as claimed in claim 26, in which the at least two transmitter devices are embedded in satellites of a satellite global navigation system and the receiver device is embedded in a vehicle comprising at least one receiver of the satellite global navigation system.

28. The determining system as claimed in claim 27, in which said relative positions of the receiver device with respect to said at least two transmitter devices are obtained from the at least one receiver of the satellite global navigation system.

29. The determining system as claimed in claim 26, in which the receiver device comprises at least three nonaligned reception antennas, and the determination of the angles of sight of said at least two transmitter devices with respect to at least two nonaligned antenna bases of said receiver device is used to determine the attitude of said receiver device with respect to said reference frame.

* * * * *

UNITED STATES PATENT AND TRADEMARK OFFICE
CERTIFICATE OF CORRECTION

PATENT NO. : 8,022,873 B2  Page 1 of 1
APPLICATION NO. : 12/362648
DATED : September 20, 2011
INVENTOR(S) : Voirin et al.

It is certified that error appears in the above-identified patent and that said Letters Patent is hereby corrected as shown below:

Column 19, line 66, in Claim 1, delete "$d_{WL}^{12}$" and insert -- $\hat{d}_{WL}^{12}$ -- therefor.

Column 20, line 19, in Claim 2, delete "$d_p^{12}$" and insert -- $\hat{d}_p^{12}$ -- therefor.

Column 20, line 32-33, in Claim 3, delete -- $d_{WL}^{12}$, $d_1^{12}$, $d_2^{12}$ -- and insert -- $\hat{d}_{WL}^{12}$, $\hat{d}_1^{12}$, $\hat{d}_2^{12}$ -- therefor.

Column 20, line 39, in Claim 4, delete -- $d_p^{12}$ -- and insert -- $\hat{d}_p^{12}$ -- therefor.

Signed and Sealed this
Twenty-first Day of February, 2012

David J. Kappos
*Director of the United States Patent and Trademark Office*